(No Model.) 3 Sheets—Sheet 3.
H. McDOUGALL & R. POTTER.
MACHINE FOR FORMING BEAM STRAPS.
No. 410,373. Patented Sept. 3, 1889.
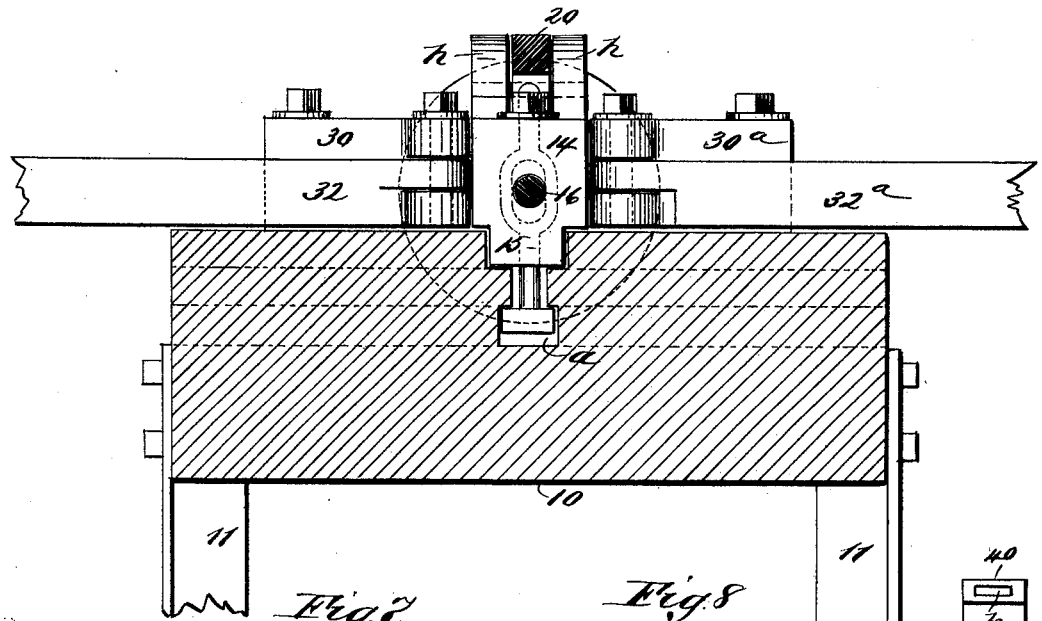
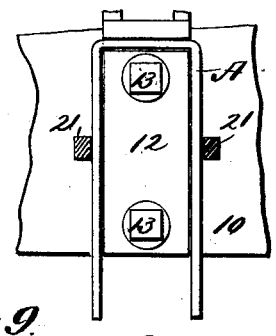
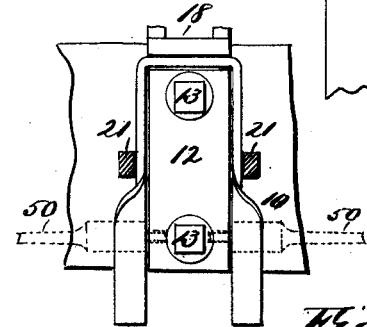
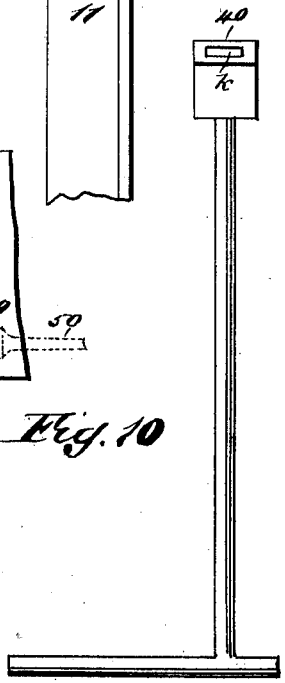
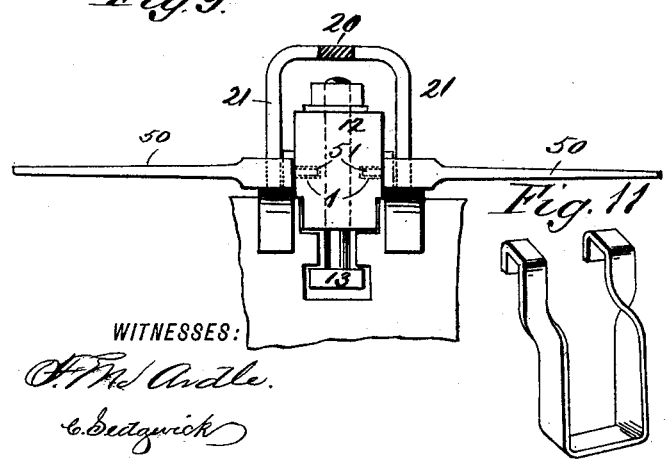
WITNESSES:
F. McArdle.
C. Sedgwick.
INVENTOR:
H. McDougall
R. Potter
BY Munn & Co.
ATTORNEYS.

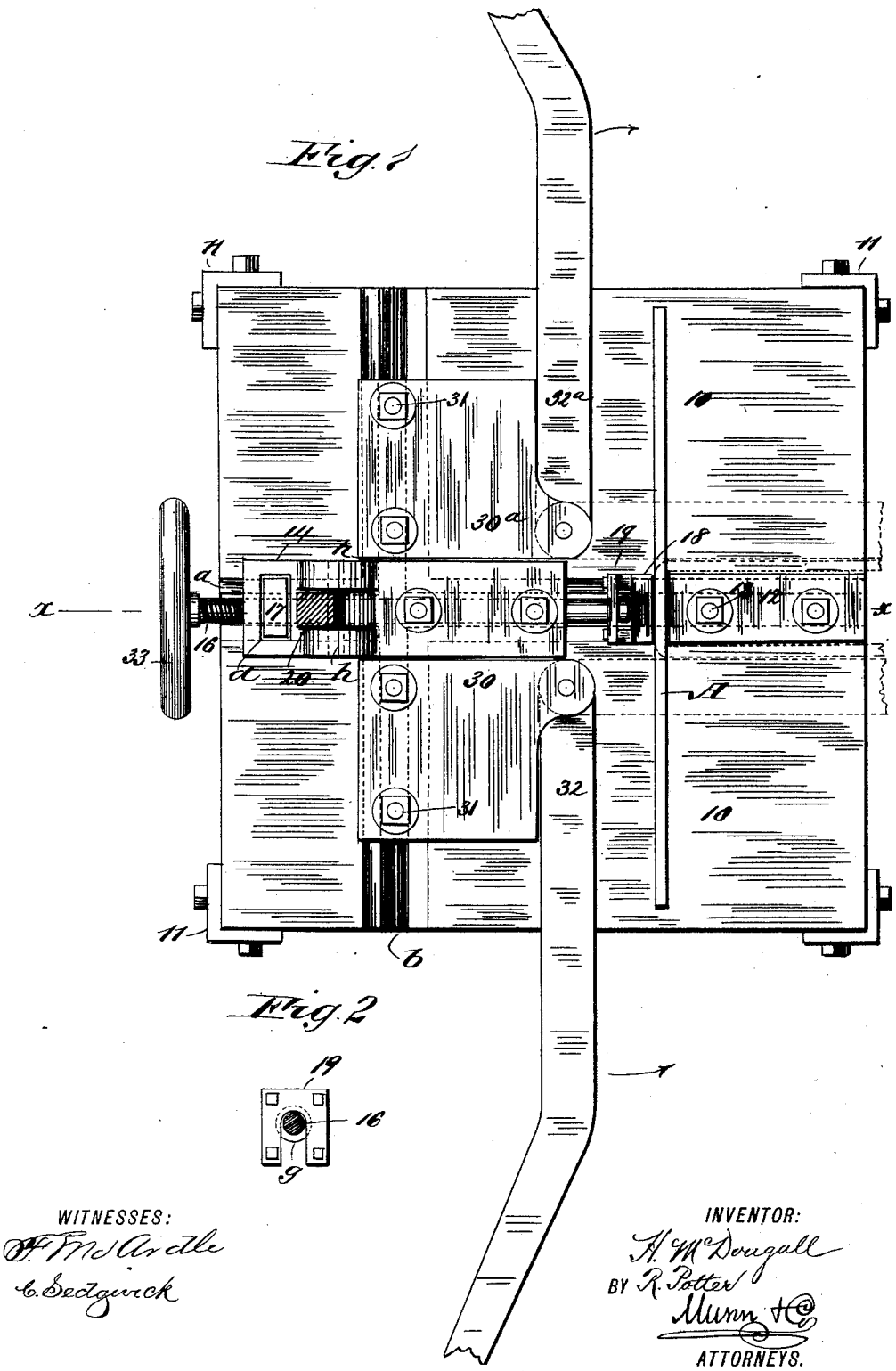

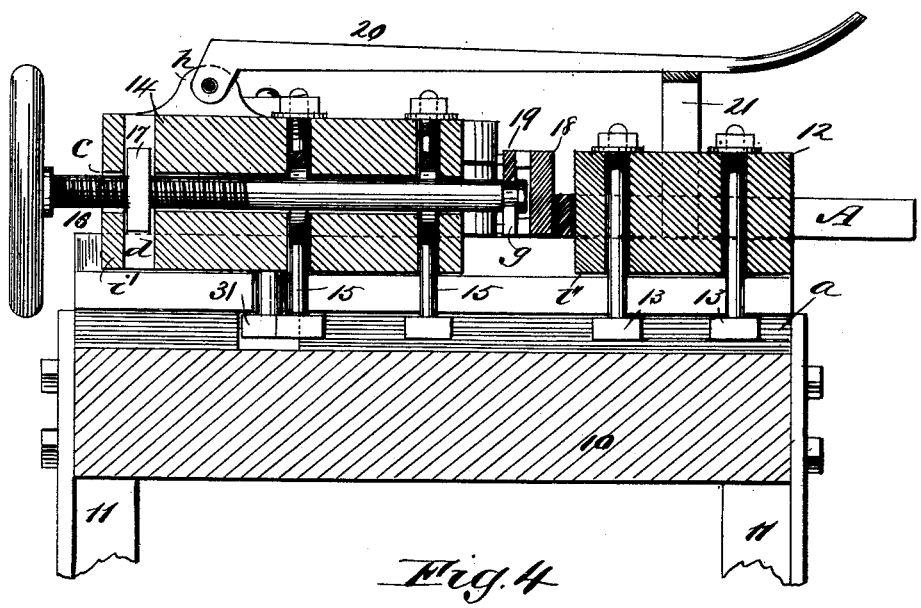
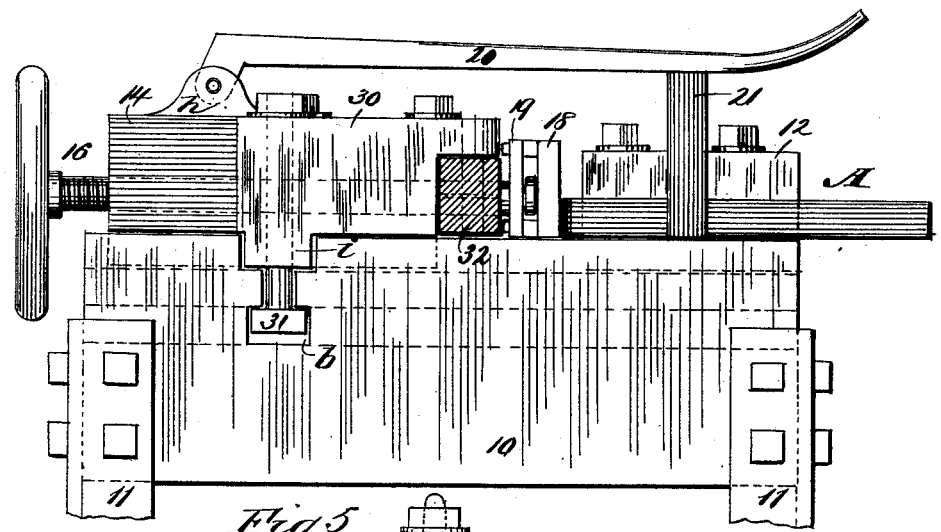
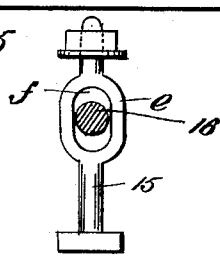

UNITED STATES PATENT OFFICE.

HENRY McDOUGALL AND ROGER POTTER, OF NEW YORK, N. Y.

MACHINE FOR FORMING BEAM-STRAPS.

SPECIFICATION forming part of Letters Patent No. 410,373, dated September 3, 1889.

Application filed May 13, 1889. Serial No. 310,511. (No model.)

*To all whom it may concern:*

Be it known that we, HENRY MCDOUGALL and ROGER POTTER, both of the city, county, and State of New York, have invented a new and Improved Implement for Forming Beam-Straps, of which the following is a full, clear, and exact description.

The object of our present invention is to improve the construction of the machine illustrated, described, and claimed in Letters Patent of the United States, No. 391,058, granted to us on the 16th day of October, A. D. 1888; and to the end named the invention consists, essentially, of certain novel constructions, arrangements, and combinations of elements whereby the implement is made adjustable, all as will be hereinafter more fully explained, and specifically pointed out in the claims.

Reference is to be had to the accompanying drawings, forming a part of this specification, in which similar figures and letters of reference indicate corresponding parts in all the views.

Figure 1 is a plan view, in partial section, of our improved implement for forming beam-straps, parts being shown in section. Fig. 2 is a detail view of the presser-head, the clamping-screw employed in connection therewith being shown in section. Fig. 3 is a central sectional elevation of our improved implement on the line $x\,x$ of Fig. 1. Fig. 4 is a side view, one of the bending-levers being shown in section. Fig. 5 is a detail view illustrating the construction of one of the block-retaining bolts, the set-screw which passes through said bolts being shown in section. Fig. 6 is a cross-sectional view of the implement. Fig. 7 is a plan view of a portion of the implement, the parts being represented as they appear after the first bends have been imparted to the strip. Fig. 8 is a similar view, the strap, however, being represented as it appears after having been twisted. Fig. 9 is a perspective view of a portion of the machine, parts being broken away and parts being shown in section, and the strap being represented as it appears after the ends have been bent down over the edge of the anvil. Fig. 10 is a perspective view of the lever employed to twist the strap-ends, and Fig. 11 is a perspective view of the completed strap.

In the drawings, 10 represents a heavy base-plate, which may be placed upon any proper support or which may be provided with legs 11. This plate 10 is formed with an undercut longitudinal groove or slot $a$ and an undercut transverse groove or slot $b$. In the longitudinal slot $a$ we mount a forming-block 12, that is held to place by bolts 13, the heads of said bolts riding in the undercut groove $a$, as shown best in Fig. 3. In the groove $a$ there is also mounted a heavy block 14, that is held to the base or bed plate 10 by bolts 15, the heads of these bolts riding in the groove $a$, the arrangement being such that the block 14 may be moved toward or from the front of the machine. The block 14 is formed with a central bore $c$, through which there passes a clamping-screw 16, which engages a nut 17, that rides in an aperture $d$, formed in the block 14, and in order that the screw 16 may pass through the block 14 we form the bolts 15 with flattened central sections $e$, in which there are apertures $f$. Near the forward end of the screw 16 there is an annular groove $g$, within which there is fitted a plate 19, that is secured to a head or clamping-block 18, the arrangement being such that the plate and the block carried thereby may be slipped upon the screw 16. The upper face of the block 14 is provided with two upwardly-extending bosses or projections $h$, and between said bosses there is pivotally mounted a forwardly-extending lever 20, which is provided with downwardly-extending arms 21, that closely approach the side faces of the block 12. Blocks 30 and $30^a$ are mounted at the sides of the block 14, these blocks being held to place by clamping or binding bolts 31, the heads of said bolts riding in the grooves $b$, and the blocks being formed with downwardly-extending sections $i$, which ride in the upper portions of said grooves, corresponding projections $i'$ and $i''$ being formed upon the blocks 14 and 12, respectively, said projections riding in the upper portions of the groove $a$. To the blocks 30 and $30^a$ we pivotally connect bending-levers 32 and $32^a$.

The blanks from which the beam-straps are to be formed are cut off to the required length and the spike-holes are formed therein. Then the blank that is to be operated upon is placed against the inner end of the block 12 and the screw 16 is turned, through the medium of its hand-wheel 33, until the head or clamping block 18 bears hard against the blank, as represented in Fig. 1, said blank being shown at A. After the parts have been adjusted, as represented in Fig. 1, the bending-levers are grasped and moved in the direction of the arrows shown in connection therewith to the position in which the parts are shown in dotted lines in Fig. 1, and this movement of the levers 32 and 32$^a$ will carry the blank ends to a position such that they will lie close against the side faces of the block 12, as represented in Fig. 7. After the movement above described has taken place, the lever 20 is turned downward until its arms 21 rest upon the bed-plate 10, just outside of the outer side faces of the blank ends, after which, and while the parts are in the position in which they are shown in Figs. 4 and 7, a double-armed twisting-lever 40, formed with a central aperture $k$, (see Fig. 10,) is brought into engagement with the blank ends and turned so as to carry said ends to the position in which they are shown in Fig. 8. After this turn or twist has been imparted to the blank, the ends of the blank are bent down over the forward edge of the block 12, this bend being brought about by any proper implement, and during the time that the blanks are being so bent they are held to place by levers 50, formed with projections 51, adapted to enter recesses $l$, that are formed in the side faces of the block 12, and after the ends of the blank have been so bent the parts will assume the position in which they are shown in Fig. 9. The partially-formed blank is then removed and the ends bent over in any proper manner, so that the strap will appear as represented in Fig. 11.

By forming the implement as above set forth we provide for the bending of straps of any required size—that is, if we wish the space between the parallel side lengths of the strap to be wider we employ a block 12 of greater width. If we wish the length of the side members of the strap to be longer, we move the block 12 back, and for each block 12 that we employ we have a clamping-block 18, of proper width to coact with the block 12, the arrangement being such that the clamping-blocks may be readily changed by simply lifting them out of engagement with the clamping-screw.

By mounting the blocks 30 and 30$^a$ in the manner above described we provide for their adjustment toward or from the block 14, and thus provide for the proper operation of the bending-levers—that is, we provide for the turning of the levers to a position such that they will be parallel with the forming-block 12 and at a distance therefrom that is equal to the thickness of the blank A.

Having thus described our invention, we claim as new and desire to secure by Letters Patent—

1. In an apparatus for forming beam-straps, the combination, with a base-plate formed with a longitudinal and a transverse groove, of a forming-block 12, a block 14, a clamping-screw which passes through said block 14 and engages a nut arranged in a recess formed in the block, a clamping block or head 18, connected to the screw 16, and pivotally-mounted bending-levers, substantially as described.

2. In an apparatus for forming beam-straps, the combination, with a base-plate, of an adjustably-mounted block 12, a clamping block or head 18, an adjustably-mounted clamping-screw, and bending-levers, substantially as described.

3. In an apparatus for forming beam-straps, the combination, with an adjustable forming-block 12, of a clamping-block and adjustably-mounted bending-levers, substantially as described.

4. In an apparatus for forming beam-straps, the combination, with a bed-plate, of a forming-block 12, held thereto, adjustably-mounted bending-levers, a block 14, formed with a central bore, bolts 15, formed with apertures $f$, a clamping-screw 16, which passes through the bore of the block 14 and through the apertures of the bolts 15, and a clamping-block connected to the clamping-screw, substantially as described.

HENRY McDOUGALL.
ROGER POTTER.

Witnesses:
EDWARD KENT, Jr.,
C. SEDGWICK.